United States Patent
Morelos-Zaragoza et al.

[11] Patent Number: 6,141,391
[45] Date of Patent: Oct. 31, 2000

[54] SYSTEM FOR IMPROVING THE PERFORMANCE AT LOW SIGNAL-TO-NOISE RATIOS OF RECEIVERS WITH VITERBI DECODERS

[75] Inventors: Robert Morelos-Zaragoza, San Jose; Advait M. Mogre, Fremont, both of Calif.

[73] Assignee: LSI Logic Corporation, Milpitas, Calif.

[21] Appl. No.: 09/018,677

[22] Filed: Feb. 4, 1998

[51] Int. Cl.[7] .............................. H03D 1/00; H04L 27/06; H04L 23/02; H04L 5/12
[52] U.S. Cl. ........................ 375/341; 375/262; 375/265; 341/43.4; 341/43.7
[58] Field of Search ................................. 375/262, 265, 375/341; 371/43.7, 43.4

[56] References Cited

U.S. PATENT DOCUMENTS

| | | | |
|---|---|---|---|
| 5,396,518 | 3/1995 | How | 375/265 |
| 5,619,539 | 4/1997 | Coker et al. | 375/341 |
| 5,621,761 | 4/1997 | Heegard | 375/265 |
| 5,910,182 | 6/1999 | Dent et al. | 714/786 |

*Primary Examiner*—Stephen Chin
*Assistant Examiner*—Michael W. Maddox

[57] ABSTRACT

The present invention includes a method and system for improving performance of a receiver at a low signal-to-noise ratio. According to a first aspect, an encoded signal is received. The encoded signal is decoded to recover information in the encoded signal. Next, a threshold is ascertained in response to the recovered information, the threshold indicating a maximum number of acceptable errors in the recovered information. It is determined if the errors in the recovered information are in excess of the ascertained threshold. Information is then extracted from the encoded signal without decoding. The extracted information is output when the errors in the recovered information are in excess of the ascertained threshold. In all other instances, the recovered information is output. According to a second aspect, recovered signal data is output, the recovered signal data being either the recovered information or the extracted information. Next, an encoding type of the recovered signal data is determined, the encoding type being feedforward encoding when the encoding is in a first state, and being feedback encoding when the encoding is in a second state. A data transformation is then performed, the data transformation adapted for performing conversion for a feedforward encoder when the encoding type is feedforward encoding, and adapted for performing conversion for a feedback encoder when the encoding type is feedback encoding.

26 Claims, 2 Drawing Sheets

SYSTEM FOR IMPROVING THE PERFORMANCE AT LOW SIGNAL-TO-NOISE RATIOS OF RECEIVERS WITH VITERBI DECODERS

BACKGROUND OF THE INVENTION

1. Field of the Invention

The present invention relates to a method and system for improving the performance at low signal-to-noise ratios of receivers with Viterbi decoders. More particularly, the present invention provides a method and system for decoding in response to bit error rate.

2. The Background Art

Referring first to FIG. 1, a communication system having a digital signal transmission and receiving system is illustrated. A transmission portion of the digital signal transmission and receiving system includes an encoder 10 and a modulator 12 providing a modulated signal at a communication channel 14. Similarly, a receiving portion of the digital signal transmission and receiving system includes a demodulator 16 and a decoder 18.

The encoder 10 may be a convolutional encoder. Convolutional codes typically include redundant symbols to increase the signal to noise ratio. In this manner, the probability of errors introduced during encoding is minimized, increasing the probability of accurate transmission. A convolutional code may be described using a trellis diagram, which illustrates all possible code sequences.

Encoding schemes may provide a feedforward realization or feedback realization scheme. A feedforward realization is typically preferred for decoding purposes, since information is associated with a corresponding state, allowing information to be recovered directly. A feedback realization stores information in the encoded bits, making it more difficult to retrieve this information. As a result, encoding schemes typically provide a feedforward realization.

In a bandwidth-limited environment, a multilevel signaling scheme, such as phase-shift keying (PSK), may be used. Thus, the modulated signal includes an in-phase component and a quadrature component. When the modulated signal is received, after conversion from an analog to a digital signal by an analog-to-digital converter, each bit is demodulated into the in-phase and quadrature signal components by the demodulator 16 using sine and cosine functions.

The decoder 18 may comprise a Viterbi decoder, which may be used to decode these convolutional codes. The optimum method for decoding convolutional codes is the Viterbi algorithm, which provides an efficient method for searching a trellis diagram for the most likely transmitted code word. Viterbi decoders typically assume a feedforward realization encoding system. It would be desirable to provide a decoding system which would accomodate a feedback realization encoding scheme as well as a feedforward encoding scheme.

Referring now to FIG. 2, a typical bit error rate (BER) 20 versus signal-to-noise ratio (SNR) 22 curve 24 for coded and uncoded systems is presented. As shown, the bit error rate curve for an uncoded system 26 decreases as the SNR 22 increases. Similarly, the bit error rate for a coded system 28 decreases in a linear fashion as the SNR 22 increases. For all digital systems, there is a signal-to-noise ratio threshold 30 above which a coded system yields a lower bit error rate than an uncoded system. However, below this signal-to-noise ratio threshold 30, a coded system will yield a higher bit error rate than an uncoded system.

Standard decoding techniques decode received signal sequences without reference to the signal-to-noise ratio threshold or corresponding bit error rate threshold. When the power of the received signal sequences, or SNR, is lower than the signal-to-noise ratio threshold, the number of errors created by the channel noise exceed the capability of the convolutional code to correct these errors. As a result, the performance of a typical Viterbi decoder below a given signal-to-noise ratio threshold is worse than a communication system of an identical rate of an uncoded system. Thus, it would be highly beneficial if the bit error rate below this signal-to-noise ratio threshold could be systematically reduced in a coded system.

BRIEF DESCRIPTION OF THE INVENTION

According to a first aspect of the present invention, a method and system for improving performance of a receiver at a low signal-to-noise ratio is disclosed. According to a first aspect, an encoded signal is received. The encoded signal is decoded to recover information in the encoded signal. Next, a threshold is ascertained in response to the recovered information, the threshold indicating a maximum number of acceptable errors in the recovered information. It is determined if the errors in the recovered information are in excess of the ascertained threshold. Information is then extracted from the encoded signal without decoding. The extracted information is output when the errors in the recovered information are in excess of the ascertained threshold. In all other instances, the recovered information is output.

The threshold may be determined in response to the bit error rate or the signal-to-noise ratio. If the threshold is based upon the bit error rate, the errors in the recovered information are in excess of the threshold when the bit error rate is greater than the bit error rate threshold. However, if the threshold is based upon the signal-to-noise ratio, the errors in the recovered information are in excess of the threshold when the signal-to-noise ratio is less than the signal-to-noise ratio threshold.

According to a second aspect of the present invention, a method and system for performing a data transformation on recovered signal data is disclosed. The recovered signal data may comprise either the recovered information or the extracted information. Next, an encoding type of the recovered signal data is determined, the encoding type being feedforward encoding when the encoding is in a first state, and being feedback encoding when the encoding is in a second state. A data transformation is then performed, the data transformation adapted for performing conversion for a feedforward encoder when the encoding type is feedforward encoding, and adapted for performing conversion for a feedback encoder when the encoding type is feedback encoding.

A BRIEF DESCRIPTION OF THE DRAWINGS

DETAILED DESCRIPTION OF THE PREFERRED EMBODIMENTS

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

The present invention provides a method and system for improving the performance at low signal-to-noise ratios of receivers with Viterbi decoders. This method may be implemented in software or firmware, as well as in programmable gate array devices, ASIC and other hardware.

Figure 1:
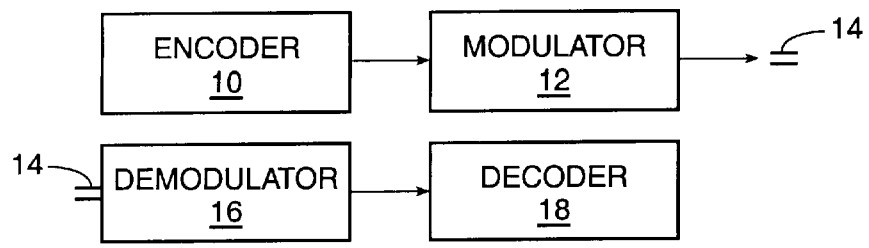
FIG. 1 illustrates a communication system having a digital signal transmission and receiving system.
Figure 2:
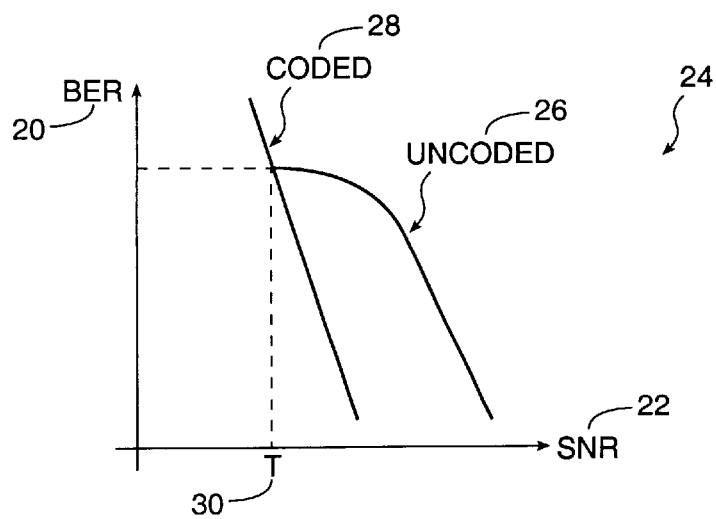
FIG. 2 illustrates a typical bit error rate (BER) versus signal-to-noise ratio (SNR) curve for coded and uncoded systems.
Figure 3:
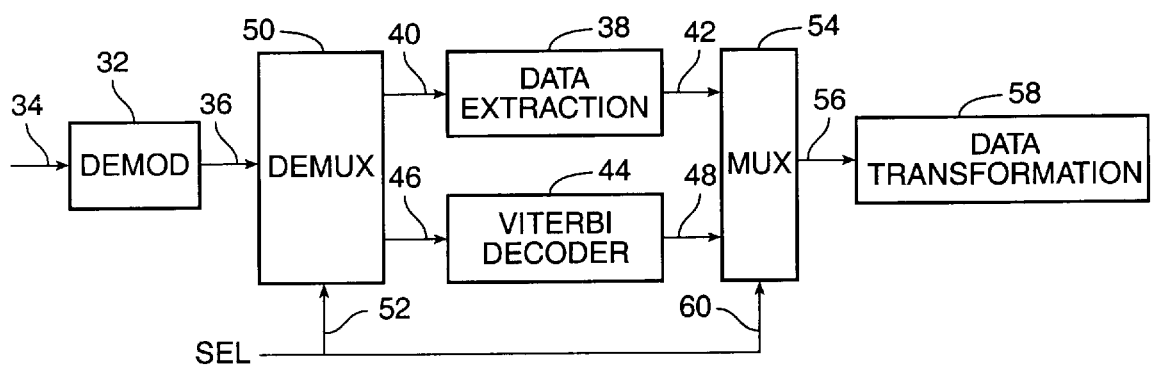
FIG. 3 illustrates a block diagram of a decoding system according to a presently preferred embodiment of the present invention.

Referring now to FIG. 3, a block diagram of a decoding system according to a presently preferred embodiment of the present invention is illustrated. A standard demodulator 32 includes an input 34 for receiving encoded signal data and an output 36. A data extraction block 38 includes an input 40 and an output 42, and is adapted for extracting information from the encoded signal data at the data extraction block input 40 without decoding and passing this information through to the data extraction block output 42. In addition, a standard Viterbi decoder 44 having an input 46 and an output 48 is provided for decoding the encoded signal data. A demultiplexer 50 operates to switch operation between the data extraction block 38 and the Viterbi decoder 44. Thus, the data extraction block 38 is activated when the SNR falls below the SNR threshold, or equivalently, when the BER increases above the bit-error-rate threshold. The Viterbi decoder 44 is activated in all other instances. The demultiplexer 50 includes an input operatively coupled to the demodulator output 36, a first output operatively coupled to the data extraction block input 40, a second output operatively coupled to the Viterbi decoder input 46, and a select line 52 operatively coupled to the bit-error-rate threshold. A multiplexer 54 has a first input operatively coupled to data extraction block output 42, a second input operatively coupled to the Viterbi decoder output 48, an output 56 operatively coupled to a data transformation block 58, and a select line 60 operatively coupled to the bit-error-rate threshold. However, one of ordinary skill in the art will readily recognize that the select lines 52, 60 to the demultiplexer and the multiplexer may alternatively be coupled to the SNR.

Unlike the Viterbi decoder 44, the data extraction block 38 operates to assign a binary integer to the received encoded signal data according to the number of possible phases, or regions, of the in-phase and quadrature components of the encoded signal data. According to a presently preferred embodiment of the present invention, n bits are required to extract information for a $2^n$ phase shift keying modulation system, allowing $2^n$ possibilities to be defined.

Figure 4:
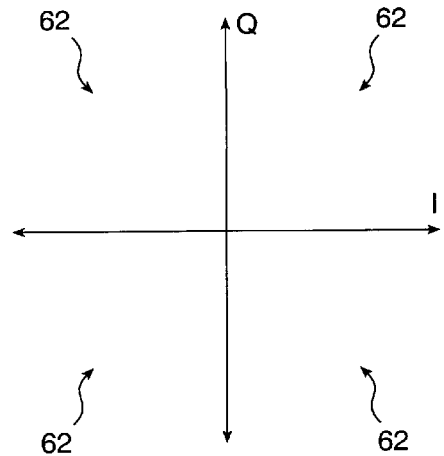
FIG. 4 illustrates a quadrature phase shift keying (QPSK) system as used in the present invention.

For example, as shown in FIG. 4, a quadrature phase shift keying (QPSK) system includes four possible phases 62 which may be translated to binary data. Thus, a minimum of 2 bits are required to accommodate $2^2$ possibilities. Similarly, an 8 phase shift keying system requires a minimum of $2^3=8$ possibilities to be defined, therefore requiring a minimum of 3 bits.

Figure 5:
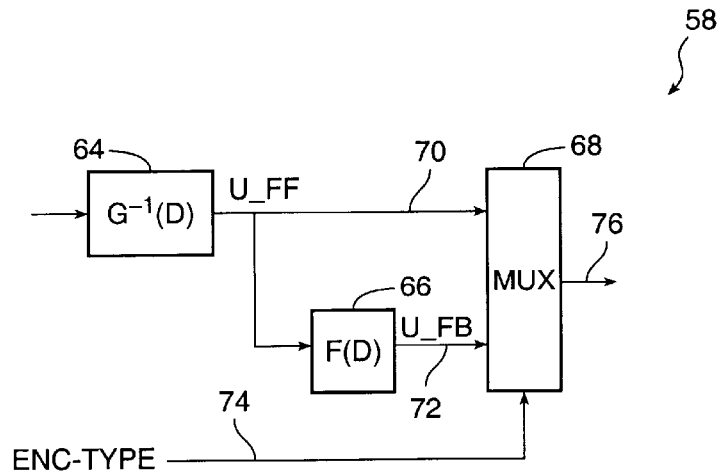
FIG. 5 illustrates a data transformation block according to a presently preferred embodiment of the present invention.

Referring now to FIG. 5, a data transformation block 58 of FIG. 3 according to a presently preferred embodiment of the present invention is illustrated. According to a presently preferred embodiment, the Viterbi decoder assumes that the Viterbi decoder uses a trellis corresponding to a feedforward realization of the convolutional encoder. Thus, a first transformation $G^{-1}(D)$ 64 is performed on the decoded or extracted data. When the encoding type indicates that the encoder comprises a feedback realization, a second transformation F(D) 66 is performed on the coded bits. Since a transformation is not required for a feedback realization of the convolutional encoder, the second transformation F(D) 66 is combined with the first transformation $G^{-1}(D)$ 64 to recover the data, since the product $G^{-1}(D)$ F(D) contains the identity matrix. Thus, when the encoding type indicates that the encoder utilizes a feedforward realization, the output of the first transformation is selected. When the encoding type indicates that the encoder utilizes a feedback realization, the output of the second transformation is selected. According to a presently preferred embodiment, a multiplexer 68 is provided having a first input 70 operatively coupled to the output of the first transformation 64, a second input 72 operatively coupled to the output of the second transformation 66, a select line 74 operatively coupled to the encoding type, and an output 76 providing the transformed data.

For a given code C of rate k/n, G(D) is a k×n code generator matrix according to the standard for the encoder used. For every k consecutive input symbols u of a given data sequence U, G(D) generates a corresponding set of n consecutive output symbols v belonging to the corresponding coded output sequence V. This may be represented by the relationship v=uG(D). Moreover, u may be defined by a row vector of dimension 1×k. Similarly, the generated output symbols v may be defined by a row vector of dimension 1×n. For a feedforward realization of the encoder, the data sequence U can be extracted from the coded output sequence V by $U=VG^{-1}(D)$, where $G^{-1}(D)$ denotes a feedback free right inverse of the systematic generator matrix G(D). In the case of a feedback realization of the encoder, a second transformation F(D) is needed to put $G^{-1}(D)$ in systematic form. Thus in this case, $U=VG^{-1}(D)$ F(D). In other words, $G^{-1}(D)$ F(D) is a right inverse of the systematic generator matrix G(D) of a feedback encoder.

Figure 6:
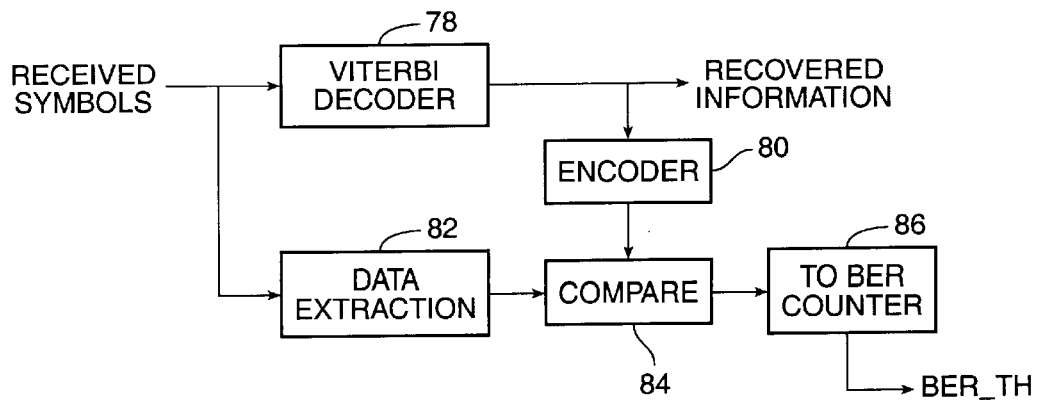
FIG. 6 illustrates a block diagram of a bit error rate (BER) monitor according to a presently preferred embodiment of the present invention.

Referring now to FIG. 6, a block diagram of a bit error rate (BER) monitor according to a presently preferred embodiment of the present invention is illustrated. One of ordinary skill in the art will readily recognize that the SNR may similarly be monitored.

Encoded symbols are received by a Viterbi decoder 78. The Viterbi decoder 78 decodes these encoded symbols at its input and produces recovered information at its output. An encoder 80 re-encodes the recovered information at the encoder 80 input and passes re-encoded symbols at the encoder 80 output. Similarly, the encoded symbols are received by the data extraction block 82 at its input and passes the extracted information through to its output. A comparison block 84 compares this extracted information produced by the data extraction block and the re-encoded symbols to calculate a bit error rate (BER). The comparison block 84 is operatively coupled to a BER/SNR counter 86. The BER/SNR counter 86 extracts the BER threshold or SNR threshold using the comparison block 86 output. One of ordinary skill in the art will readily recognize that the signal-to-noise ratio and bit error rate thresholds will depend on the number of states of the trellis and the modulation format.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for improving performance of a receiver at a low signal-to-noise ratio, the method comprising the following steps:

receiving an encoded signal;

decoding the encoded signal to recover information in the encoded signal;

ascertaining a threshold in response to the recovered information, the threshold indicating a maximum number of acceptable errors in the recovered information;

determining if errors in the recovered information are in excess of the ascertained threshold;

extracting information from the encoded signal without decoding; and outputting the extracted information when the errors in the recovered information are in excess of the ascertained threshold, and otherwise outputting the recovered information.

2. The method according to claim 1, wherein the ascertaining step further includes the following sub-steps:

ascertaining a bit error rate.

3. The method according to claim 1, wherein the ascertaining step further includes the following sub-steps:

ascertaining a signal-to-noise ratio.

4. The method according to claim 1, the method further including the following sub-steps:

receiving recovered signal data from the outputting step;

determining an encoding type of the recovered signal data, the encoding type being feedforward encoding when the encoding is in a first state, and being feedback encoding when the encoding is in a second state; and performing a data transformation, the data transformation adapted for performing conversion for a feedforward encoder when the encoding type is feedforward encoding, and adapted for performing conversion for a feedback encoder when the encoding type is feedback encoding.

5. The method according to claim 4, wherein the performing step further includes the following sub-steps:

performing a first transformation on the recovered signal data to retrieve encoded information when the encoding type is feedforward encoding; and performing a second transformation on the recovered signal data to retrieve encoded information when the encoding type is feedback encoding.

6. The method according to claim 4, wherein the performing step further includes the following sub-steps:

performing a first transformation on the recovered signal data to produce feedforward data; and performing a second transformation on the feedforward data to retrieve encoded information when the encoding type is feedback encoding.

7. A method for performing a data transformation on recovered signal data, the method comprising the following steps:

determining an encoding type of the recovered signal data, the encoding type being feedforward encoding when the encoding is in a first state, and being feedback encoding when the encoding is in a second state;

performing a first transformation on the recovered signal data to retrieve encoded information when the encoding type is feedforward encoding; and performing a second transformation on the recovered signal data to retrieve encoded information when the encoding type is feedback encoding.

8. A method for performing a data transformation on recovered signal data, the method comprising the following steps:

determining an encoding type of the recovered signal data, the encoding type being feedforward encoding when the encoding is in a first state, and being feedback encoding when the encoding is in a second state;

performing a first transformation on the recovered signal data to produce feedforward data; and performing a second transformation on the feedforward data to retrieve encoded information when the encoding type is feedback encoding.

9. A method for improving performance of a receiver at a low signal-to-noise ratio, the method comprising the following steps:

receiving an encoded signal;

decoding the encoded signal to recover information in the encoded signal;

ascertaining a threshold in response to the recovered information, the threshold indicating a maximum number of acceptable errors in the recovered information;

determining if errors in the recovered information are in excess of the ascertained threshold;

extracting information from the encoded signal without decoding;

outputting the extracted information when the errors in the recovered information are in excess of the ascertained threshold, and otherwise outputting the recovered information;

receiving recovered signal data from the outputting step;

determining an encoding type of the recovered signal data, the encoding type being feedforward encoding when the encoding is in a first state, and being feedback encoding when the encoding is in a second state; and performing a data transformation, the data transformation adapted for performing conversion for a feedforward encoder when the encoding type is feedforward encoding, and adapted for performing conversion for a feedback encoder when the encoding type is feedback encoding.

10. A method for improving performance of a receiver at a low signal-to-noise ratio, the method comprising the following steps:

receiving an encoded signal;

decoding the encoded signal to recover information in the encoded signal;

ascertaining a threshold in response to the recovered information, the threshold indicating a maximum number of acceptable errors in the recovered information;

determining if errors in the recovered information are in excess of the ascertained threshold;

extracting information from the encoded signal without decoding;

outputting the extracted information when the errors in the recovered information are in excess of the ascertained threshold, and otherwise outputting the recovered information;

receiving recovered signal data from the outputting step;

determining an encoding type of the recovered signal data, the encoding type being feedforward encoding when the encoding is in a first state, and being feedback encoding when the encoding is in a second state;

performing a first transformation on the recovered signal data to retrieve encoded information when the encoding type is feedforward encoding; and performing a second transformation on the recovered signal data to retrieve encoded information when the encoding type is feedback encoding.

11. A method for improving performance of a receiver at a low signal-to-noise ratio, the method comprising the following steps:

receiving an encoded signal;

decoding the encoded signal to recover information in the encoded signal;

ascertaining a threshold in response to the recovered information, the threshold indicating a maximum number of acceptable errors in the recovered information;

determining if errors in the recovered information are in excess of the ascertained threshold;

extracting information from the encoded signal without decoding;

outputting the extracted information when the errors in the recovered information are in excess of the ascertained threshold, and otherwise outputting the recovered information;

receiving recovered signal data from the outputting step;

determining an encoding type of the recovered signal data, the encoding type being feedforward encoding when the encoding is in a first state, and being feedback encoding when the encoding is in a second state;

performing a first transformation on the recovered signal data to produce feedforward data; and performing a second transformation on the feedforward data to retrieve encoded information when the encoding type is feedback encoding.

12. An apparatus for improving performance of a receiver at a low signal-to-noise ratio, comprising:

means for receiving an encoded signal;

means for decoding the encoded signal to recover information in the encoded signal;

means for ascertaining a threshold in response to the recovered information, the threshold indicating a maximum number of acceptable errors in the recovered information;

means for determining if errors in the recovered information are in excess of the ascertained threshold;

means for extracting information from the encoded signal without decoding; and means for outputting the extracted information when the errors in the recovered information when the errors in the recovered information are in excess of the ascertained threshold, and otherwise outputting the recovered information.

13. The apparatus according to claim 12, wherein the means for ascertaining further includes:

means for ascertaining a bit error rate.

14. The apparatus according to claim 12, wherein the means for ascertaining further includes:

means for ascertaining a signal-to-noise ratio.

15. The apparatus according to claim 12, further including:

means for receiving recovered signal data from the outputting step;

means for determining an encoding type of the recovered signal data, the encoding type being feedforward encoding when the encoding is in a first state, and being feedback encoding when the encoding is in a second state; and means for performing a data transformation, the data transformation adapted for performing conversion for a feedforward encoder when the encoding type is feedforward encoding, and adapted for performing conversion for a feedback encoder when the encoding type is feedback encoding.

16. The apparatus according to claim 15, wherein the means for performing further includes:

means for performing a first transformation on the recovered signal data to retrieve encoded information when the encoding type is feedforward encoding; and means for performing a second transformation on the recovered signal data to retrieve encoded information when the encoding type is feedback encoding.

17. The apparatus according to claim 15, wherein the means for performing step further includes:

means for performing a first transformation on the recovered signal data to produce feedforward data; and means for performing a second transformation on the feedforward data to retrieve encoded information when the encoding type is feedback encoding.

18. An apparatus for performing a data transformation on recovered signal data, comprising:

means for determining an encoding type of the recovered signal data, the encoding type being feedforward encoding when the encoding is in a first state, and being feedback encoding when the encoding is in a second state;

means for performing a first transformation on the recovered signal data to retrieve encoded information when the encoding type is feedforward encoding; and means for performing a second transformation on the recovered signal data to retrieve encoded information when the encoding type is feedback encoding.

19. An apparatus for performing a data transformation on recovered signal data, comprising:

means for determining an encoding type of the recovered signal data, the encoding type being feedforward encoding when the encoding is in a first state, and being feedback encoding when the encoding is in a second state;

means for performing a first transformation on the recovered signal data to produce feedforward data; and means for performing a second transformation on the feedforward data to retrieve encoded information when the encoding type is feedback encoding.

20. An apparatus for improving performance of a receiver at a low signal-to-noise ratio, comprising:

means for receiving an encoded signal;

means for decoding the encoded signal to recover information in the encoded signal;

means for ascertaining a threshold in response to the recovered information, the threshold indicating a maximum number of acceptable errors in the recovered information;

means for determining if errors in the recovered information are in excess of the ascertained threshold;

means for extracting information from the encoded signal without decoding;

means for outputting the extracted information when the errors in the recovered information are in excess of the ascertained threshold, and otherwise outputting the recovered information;

means for receiving recovered signal data from the outputting step;

means for determining an encoding type of the recovered signal data, the encoding type being feedforward encoding when the encoding is in a first state, and being feedback encoding when the encoding is in a second state; and means for performing a data transformation, the data transformation adapted for performing conversion for a feedforward encoder when the encoding type is feedforward encoding, and adapted for performing conversion for a feedback encoder when the encoding type is feedback encoding.

21. An apparatus for improving performance of a receiver at a low signal-to-noise ratio, comprising:

means for receiving an encoded signal;

means for decoding the encoded signal to recover information in the encoded signal;

means for ascertaining a threshold in response to the recovered information, the threshold indicating a maximum number of acceptable errors in the recovered information;

means for determining if errors in the recovered information are in excess of the ascertained threshold;

means for extracting information from the encoded signal without decoding;

means for outputting the extracted information when the errors in the recovered information are in excess of the ascertained threshold, and otherwise outputting the recovered information;

means for receiving recovered signal data from the outputting step;

means for determining an encoding type of the recovered signal data, the encoding type being feedforward encoding when the encoding is in a first state, and being feedback encoding when the encoding is in a second state;

means for performing a first transformation on the recovered signal data to retrieve encoded information when the encoding type is feedforward encoding; and means for performing a second transformation on the recovered signal data to retrieve encoded information when the encoding type is feedback encoding.

22. An apparatus for improving performance of a receiver at a low signal-to-noise ratio, comprising:

means for receiving an encoded signal;

means for decoding the encoded signal to recover information in the encoded signal;

means for ascertaining a threshold in response to the recovered information, the threshold indicating a maximum number of acceptable errors in the recovered information;

means for determining if errors in the recovered information are in excess of the ascertained threshold;

means for extracting information from the encoded signal without decoding;

means for outputting the extracted information when the errors in the recovered information are in excess of the ascertained threshold, and otherwise outputting the recovered information;

means for receiving recovered signal data from the outputting step;

means for determining an encoding type of the recovered signal data, the encoding type being feedforward encoding when the encoding is in a first state, and being feedback encoding when the encoding is in a second state;

means for performing a first transformation on the recovered signal data to produce feedforward data; and means for performing a second transformation on the feedforward data to retrieve encoded information when the encoding type is feedback encoding.

23. An apparatus for improving performance of a receiver at a low signal-to-noise ratio, comprising:

a demodulator having an input for receiving encoded signal data and an output, the encoded signal data having an in-phase and a quadrature component;

a data extraction block having an input and an output, the data extraction block being adapted for extracting information from the encoded signal data at the data extraction block input without decoding and passing this information through to the data extraction block output;

a Viterbi decoder having an input and an output, the Viterbi decoder adapted for decoding the encoded signal data;

a demultiplexer having an input operatively coupled to the demodulator output, a first output operatively coupled to the data extraction block input, a second output operatively coupled to the Viterbi decoder input, and a select line operatively coupled to a threshold error value; and a multiplexer having a first input operatively coupled to the data extraction block output, a second input operatively coupled to the Viterbi decoder output, an output operatively coupled to a data transformation block, and a select line operatively coupled to the threshold error value, the data transformation block adapted for extracting a data sequence from the multiplexer output through application of a transformation, the transformation being a first transformation for a feedforward encoder and a second transformation for a feedback encoder.

24. The apparatus according to claim 23, wherein the data extraction block operates to assign a binary integer to the encoded signal data according to the in-phase and quadrature components of the encoded signal data.

25. The apparatus according to claim 23, wherein the threshold error value is operatively coupled to a bit error rate, the demultiplexer activating the data extraction block when the bit error rate increases above a bit error rate threshold, and otherwise activating the Viterbi decoder.

26. The apparatus according to claim 23, wherein the threshold error value is operatively coupled to a signal-to-noise ratio, the demultiplexer activing the data extraction block when the signal-to-noise ratio falls below a signal-to-noise ratio threshold, and otherwise activating the Viterbi decoder.

* * * * *